US012765458B2

(12) United States Patent
Holoubek et al.

(10) Patent No.: US 12,765,458 B2
(45) Date of Patent: Oct. 20, 2026

(54) ROW-BY-ROW YIELD ESTIMATION SYSTEM AND RELATED DEVICES AND METHODS

(71) Applicant: Ag Leader Technology, Ames, IA (US)

(72) Inventors: Joe Holoubek, Ames, IA (US); Aaron Friedlein, Farmersburg, IA (US)

(73) Assignee: Ag Leader Technology, Ames, IA (US)

( * ) Notice: Subject to any disclaimer, the term of this patent is extended or adjusted under 35 U.S.C. 154(b) by 656 days.

(21) Appl. No.: 17/939,779

(22) Filed: Sep. 7, 2022

(65) Prior Publication Data

US 2023/0073551 A1 Mar. 9, 2023

Related U.S. Application Data

(60) Provisional application No. 63/241,393, filed on Sep. 7, 2021.

(51) Int. Cl.
*A01D 41/127* (2006.01)
*A01B 79/00* (2006.01)

(52) U.S. Cl.
CPC ........ *A01D 41/1271* (2013.01); *A01B 79/005* (2013.01)

(58) Field of Classification Search
CPC ................................................ A01D 41/1271
See application file for complete search history.

(56) References Cited

U.S. PATENT DOCUMENTS 2,419,061 A 4/1947 Emery
2,813,709 A 11/1957 Hyman
3,007,570 A 11/1961 Davidson
3,038,544 A 6/1962 Richey et al.
3,178,873 A 4/1965 Meyer
3,246,701 A 4/1966 Horst
3,271,940 A 9/1966 Robert
3,616,690 A 11/1971 Harden
3,780,817 A 12/1973 Videon
(Continued)

FOREIGN PATENT DOCUMENTS

AU 2020201559 A1 4/2020
BE 1023764 B1 7/2017
(Continued)

OTHER PUBLICATIONS

Baweja, Harjatin & Parhar, Tanvir & Mirbod, Omeed & Nuske, Stephen. (2018). StalkNet: A Deep Learning Pipeline for High-Throughput Measurement of Plant Stalk Count and Stalk Width.
(Continued)

*Primary Examiner* — Claude J Brown

(74) *Attorney, Agent, or Firm* — DENTONS DAVIS BROWN PC; Matthew Warner-Blankenship; Kassandra Rittmer

(57) ABSTRACT

A yield estimation system comprising a harvester. The harvester comprising a plurality of row units, one or more stalk sensors on each of the plurality of row units, and a yield monitor in communication with the plurality of row units. The system also comprising a processor configured to correlate data from the one or more stalk sensors to data from the yield monitor on a row-by-row basis and a display configured to display the correlated data to a user.

17 Claims, 6 Drawing Sheets

(56) References Cited

U.S. PATENT DOCUMENTS 3,853,000 A 12/1974 Barnett
T934,002 I4 5/1975 Trail
3,972,381 A 8/1976 Gail
3,992,933 A 11/1976 Randolph
4,121,049 A 10/1978 Roeber
4,126,984 A 11/1978 Gail
4,166,349 A 9/1979 Coenenberg et al.
4,197,690 A 4/1980 Eistert
4,295,323 A 10/1981 Maier et al.
4,362,218 A 12/1982 Shoberg
4,418,521 A 12/1983 Orlando
4,423,640 A 1/1984 Jetter
4,505,094 A 3/1985 Demorest
4,528,804 A 7/1985 Williams
4,751,849 A 6/1988 Paros
4,883,964 A 11/1989 Bohman
4,896,491 A 1/1990 Warnsholz
4,918,441 A 4/1990 Bohman
4,967,362 A 10/1990 Schutten et al.
5,044,210 A 9/1991 Kuhn et al.
5,216,795 A 6/1993 Hansson
5,264,709 A 11/1993 Kamimura
5,343,761 A 9/1994 Myers
5,369,603 A 11/1994 Myers
5,463,854 A 11/1995 Chmielewski, Jr.
5,480,354 A 1/1996 Sadjadi
5,568,405 A 10/1996 Easton et al.
5,598,794 A 2/1997 Harms et al.
5,638,988 A 6/1997 Rogers
5,680,750 A 10/1997 Stefl
5,751,576 A 5/1998 Monson
5,790,428 A 8/1998 Easton et al.
5,847,290 A 12/1998 Kim
5,878,561 A 3/1999 Gunn
5,921,070 A 7/1999 Chamberlain
5,927,054 A 7/1999 Chamberlain
5,991,694 A 11/1999 Gudat et al.
6,041,583 A 3/2000 Goering
6,073,427 A 6/2000 Nichols
6,085,846 A 7/2000 Buchl et al.
6,092,476 A 7/2000 Wilson
6,119,442 A 9/2000 Hale
6,202,395 B1 3/2001 Gramm
6,216,795 B1 4/2001 Buchl
6,272,819 B1 8/2001 Wendte
6,431,981 B1 8/2002 Shinners
6,525,276 B1 2/2003 Vellidus
6,530,197 B1 3/2003 Christensen
6,584,390 B2 6/2003 Beck
6,615,570 B2 9/2003 Beck
6,668,223 B2 12/2003 Blackmore et al.
6,774,320 B2 8/2004 Simons
6,983,582 B1 1/2006 Muckler
7,354,341 B1 4/2008 Smith
7,357,036 B2 4/2008 Steprath
7,401,506 B2 7/2008 Kunow
7,401,528 B2 7/2008 Deppermann et al.
7,647,753 B2 1/2010 Schlipf
7,716,905 B2 5/2010 Wilcox et al.
7,739,861 B2 6/2010 Mackin
7,790,991 B2 9/2010 Verhaeghe
7,916,898 B2 3/2011 Anderson
8,006,472 B1 8/2011 Schreiner
8,010,261 B2 8/2011 Brubaker
8,196,380 B2 6/2012 Carboni
8,201,388 B1 6/2012 Vandeven
8,215,191 B2 7/2012 Tragesser et al.
8,220,235 B2 7/2012 Kowalchuk
8,224,534 B2 7/2012 Kowalchuk
8,418,636 B2 4/2013 Liu et al.
8,820,039 B2 9/2014 Werning
8,987,615 B2 3/2015 Khatavkar
9,030,549 B2 5/2015 Redden
9,064,173 B2 6/2015 Redden
9,066,463 B2 6/2015 Lange
9,213,905 B2 12/2015 Lange
9,232,693 B2 1/2016 Hendrickson et al.
9,282,693 B2 3/2016 Anderson
9,310,329 B2 4/2016 Acheson et al.
9,320,196 B2 4/2016 Dybro et al.
9,322,629 B2 4/2016 Sauder et al.
9,360,383 B2 6/2016 Coleman
9,372,109 B2 6/2016 Acheson et al.
9,410,840 B2 8/2016 Acheson et al.
9,423,249 B2 8/2016 Deppermann et al.
9,485,914 B2 11/2016 Schleicher et al.
9,565,802 B2 2/2017 Schleicher
9,578,804 B2 2/2017 Gessel
9,578,808 B2 2/2017 Dybro
9,609,806 B2 4/2017 Schlipf
9,645,006 B2 5/2017 Phelan
9,658,201 B2 5/2017 Redden et al.
9,668,412 B2 6/2017 Ritter
9,668,420 B2 6/2017 Anderson
9,693,496 B2 7/2017 Tevs et al.
9,693,503 B2 7/2017 Dybro et al.
9,696,162 B2 7/2017 Anderson
9,717,171 B2 8/2017 Redden et al.
9,756,771 B2 9/2017 Redden
9,804,097 B1 10/2017 Tang et al.
9,826,673 B1 11/2017 Ray
9,832,928 B2 12/2017 Dybro et al.
9,867,334 B2 1/2018 Jongmans et al.
9,867,335 B1 1/2018 Obbink et al.
9,894,835 B2 2/2018 Sauder et al.
9,921,064 B2 3/2018 Schleicher
9,927,242 B2 3/2018 Schleicher
9,936,631 B1 4/2018 Hubner et al.
9,936,637 B2 4/2018 Anderson et al.
9,972,058 B2 5/2018 Romier
9,974,233 B2 5/2018 Ueda et al.
9,983,048 B1 5/2018 Meier
10,034,424 B2 7/2018 Anderson
10,039,228 B2 8/2018 Walker
10,039,231 B2 8/2018 Anderson et al.
10,130,035 B2 11/2018 Crow
10,178,828 B2 1/2019 Hendrickson et al.
10,188,037 B2 1/2019 Sauder
10,255,670 B1 4/2019 Wu
10,295,703 B2 5/2019 Dybro
10,299,422 B2 5/2019 Schleicher
10,473,592 B2 11/2019 Kramer et al.
10,537,060 B2 1/2020 Sauder et al.
10,582,662 B2 3/2020 Ricketts
10,713,768 B2 7/2020 Berghoefer
10,820,508 B2 11/2020 Dix et al.
10,859,479 B2 12/2020 Brune et al.
11,048,938 B2 6/2021 Hundley et al.
11,064,653 B2 7/2021 Zielke et al.
11,079,725 B2 8/2021 Palla
11,129,333 B2 9/2021 Derscheid
11,234,366 B2 2/2022 Darr
11,275,941 B2 3/2022 Papanikolopoulos et al.
11,297,768 B2 4/2022 Schildroth et al.
11,432,464 B2 9/2022 Hayashi
11,678,607 B2 6/2023 Zielke et al.
11,704,810 B2 7/2023 Sneyders
11,758,845 B2 9/2023 Zielke et al.
11,758,848 B2 9/2023 Eichhorn
2002/0091458 A1 7/2002 Moore
2002/0173893 A1 11/2002 Blackmore et al.
2003/0019196 A1 1/2003 Coers
2004/0050138 A1 3/2004 Beck
2004/0194442 A1 10/2004 Maertens
2007/0044445 A1 3/2007 Spicer et al.
2007/0228707 A1 10/2007 Curtis
2007/0289281 A1 12/2007 Altepost
2008/0046154 A1 2/2008 Bares
2008/0289308 A1 11/2008 Brubaker
2009/0192734 A1 7/2009 Mackin
2010/0089178 A1 4/2010 Tragresser
2010/0228521 A1 9/2010 Hamamoto
2011/0173942 A1 7/2011 Kowalchuk
2012/0029757 A1 2/2012 Kowalchuk

(56) References Cited

U.S. PATENT DOCUMENTS

| | | | |
|---|---|---|---|
| 2012/0042618 | A1 | 2/2012 | Lohrentz |
| 2012/0042619 | A1 | 2/2012 | Lohrentz et al. |
| 2012/0055131 | A1 | 3/2012 | Zegota |
| 2012/0055133 | A1 | 3/2012 | Lohrentz |
| 2012/0204528 | A1 | 8/2012 | Regier |
| 2012/0253611 | A1 | 10/2012 | Zielke |
| 2013/0125800 | A1 | 5/2013 | Landphair et al. |
| 2013/0152535 | A1 | 6/2013 | Roberge |
| 2014/0020354 | A1 | 1/2014 | Tilly |
| 2014/0116077 | A1 | 5/2014 | Pierce |
| 2014/0230391 | A1 | 8/2014 | Hendrickson |
| 2014/0230580 | A1 | 8/2014 | Dybro |
| 2014/0236381 | A1 | 8/2014 | Anderson |
| 2014/0294247 | A1 | 10/2014 | Sirault |
| 2014/0311113 | A1 | 10/2014 | Bonefas |
| 2014/0331631 | A1 | 11/2014 | Sauder |
| 2015/0082760 | A1 | 3/2015 | Zentner |
| 2015/0082780 | A1 | 3/2015 | Dueckinghaus |
| 2015/0245560 | A1 | 9/2015 | Middelberg |
| 2015/0253427 | A1 | 9/2015 | Slitcher |
| 2015/0257337 | A1 | 9/2015 | Schrattenecker |
| 2015/0289438 | A1 | 10/2015 | Sauder et al. |
| 2015/0293029 | A1 | 10/2015 | Acheson |
| 2015/0293068 | A1 | 10/2015 | Acheson et al. |
| 2015/0302305 | A1 | 10/2015 | Rupp |
| 2015/0319929 | A1 | 11/2015 | Hendrickson |
| 2015/0327440 | A1 | 11/2015 | Dybro |
| 2015/0334920 | A1 | 11/2015 | Schleicher |
| 2016/0037709 | A1 | 2/2016 | Sauder et al. |
| 2016/0041803 | A1 | 2/2016 | Markov |
| 2016/0077075 | A1 | 3/2016 | Reich |
| 2016/0084813 | A1 | 3/2016 | Anderson |
| 2016/0084987 | A1 | 3/2016 | Dybro |
| 2016/0120129 | A1 | 5/2016 | Verhaeghe |
| 2016/0174465 | A1 | 6/2016 | Kohls |
| 2016/0252384 | A1 | 9/2016 | Wilson |
| 2016/0338267 | A1 | 11/2016 | Anderson |
| 2016/0345485 | A1 | 12/2016 | Acheson |
| 2017/0013777 | A1 | 1/2017 | Posselius |
| 2017/0061211 | A1 | 3/2017 | Hundley et al. |
| 2017/0089742 | A1 | 3/2017 | Bruns |
| 2017/0199528 | A1 | 7/2017 | Detweiler |
| 2017/0228118 | A1 | 8/2017 | Sugumarn et al. |
| 2017/0251600 | A1 | 9/2017 | Anderson |
| 2017/0332551 | A1 | 11/2017 | Todd |
| 2017/0339827 | A1 | 11/2017 | Anderson |
| 2018/0017965 | A1 | 1/2018 | Kosa |
| 2018/0084725 | A1 | 3/2018 | Ostermeier |
| 2018/0092303 | A1 | 4/2018 | Goering |
| 2018/0121725 | A1 | 5/2018 | Redden |
| 2018/0164471 | A1 | 6/2018 | Dybro |
| 2018/0199509 | A1 | 7/2018 | Ricketts |
| 2018/0228086 | A1 | 8/2018 | Cook |
| 2018/0338423 | A1 | 11/2018 | Lucca |
| 2018/0368321 | A1 | 12/2018 | Noonan |
| 2018/0373259 | A1 | 12/2018 | Aberle |
| 2019/0000007 | A1 | 1/2019 | Schleicher |
| 2019/0059223 | A1 | 2/2019 | Seiders |
| 2019/0110394 | A1 | 4/2019 | VanNahmen |
| 2019/0150357 | A1 | 5/2019 | Wu |
| 2019/0174667 | A1 | 6/2019 | Gresch |
| 2019/0195762 | A1 | 6/2019 | Brune |
| 2019/0258859 | A1 | 8/2019 | Baynes |
| 2019/0261561 | A1 | 8/2019 | Heitmann |
| 2020/0000031 | A1 | 1/2020 | Koch |
| 2020/0000034 | A1 | 1/2020 | Schlipf |
| 2020/0008351 | A1 | 1/2020 | Zielke |
| 2020/0053961 | A1 | 2/2020 | Dix |
| 2020/0060056 | A1 | 2/2020 | Koch |
| 2020/0068803 | A1 | 3/2020 | Sauder et al. |
| 2020/0221635 | A1 | 7/2020 | Hendrickson |
| 2020/0326674 | A1 | 10/2020 | Palla |
| 2020/0344948 | A1 | 11/2020 | Li |
| 2020/0394580 | A1 | 12/2020 | Bull |
| 2021/0051849 | A1 | 2/2021 | Asebedo |
| 2021/0059114 | A1 | 3/2021 | Eichhorn et al. |
| 2021/0076569 | A1 | 3/2021 | Blank |
| 2021/0132618 | A1 | 5/2021 | Van Roekel |
| 2021/0168991 | A1 | 6/2021 | Dix |
| 2021/0195824 | A1 | 7/2021 | Van Roekel |
| 2021/0315160 | A1 | 10/2021 | Zielke |
| 2021/0318118 | A1 | 10/2021 | Eichhorn |
| 2021/0321567 | A1 | 10/2021 | Sidon |
| 2021/0329837 | A1 | 10/2021 | Schnaider |
| 2021/0329838 | A1 | 10/2021 | Zielke et al. |
| 2021/0340794 | A1 | 11/2021 | Dickinson |
| 2021/0352847 | A1 | 11/2021 | Hunt |
| 2022/0000024 | A1 | 1/2022 | Zielke |
| 2022/0000029 | A1 | 1/2022 | Ricketts |
| 2022/0071093 | A1 | 3/2022 | Risius |
| 2022/0078975 | A1 | 3/2022 | Slichter |
| 2022/0132737 | A1 | 5/2022 | Anderson |
| 2022/0192082 | A1 | 6/2022 | Rosenberg |
| 2022/0225569 | A1 | 7/2022 | Zielke et al. |
| 2022/0232759 | A1 | 7/2022 | Sauder |
| 2022/0264798 | A1 | 8/2022 | Martin |
| 2022/0317688 | A1 | 10/2022 | Li |
| 2022/0386527 | A1 | 12/2022 | Schleicher |
| 2023/0000015 | A1 | 1/2023 | Herrmann |
| 2023/0073551 | A1 | 3/2023 | Holoubek |
| 2023/0134768 | A1 | 5/2023 | Hunt |
| 2023/0139169 | A1 | 5/2023 | Cleodolphi |
| 2023/0189690 | A1 | 6/2023 | Friedlein et al. |
| 2023/0229163 | A1 | 7/2023 | Rust |
| 2023/0240185 | A1 | 8/2023 | Zielke et al. |
| 2023/0243693 | A1 | 8/2023 | McClelland |
| 2023/0292664 | A1 | 9/2023 | Zielke et al. |
| 2023/0389473 | A1 | 12/2023 | Reed |
| 2023/0401703 | A1 | 12/2023 | Friedlein et al. |
| 2024/0023482 | A1 | 1/2024 | Zielke et al. |
| 2024/0065156 | A1 | 2/2024 | Woodcock et al. |
| 2024/0081171 | A1 | 3/2024 | Schwartz et al. |
| 2024/0090379 | A1 | 3/2024 | Eichhorn |
| 2024/0373785 | A1 | 11/2024 | Risius |
| 2024/0389494 | A1 | 11/2024 | Vorobiev |
| 2025/0185540 | A1 | 6/2025 | Eichhorn |
| 2025/0194459 | A1 | 6/2025 | Roe |
| 2025/0351773 | A1 | 11/2025 | Zielke |
| 2026/0060174 | A1 | 3/2026 | Zielke |
| 2026/0083057 | A1 | 3/2026 | Zielke |
| 2026/0096511 | A1 | 4/2026 | Zielke |
| 2026/0107878 | A1 | 4/2026 | Risius |
| 2026/0110552 | A1 | 4/2026 | Johnson |
| 2026/0137029 | A1 | 5/2026 | Friedlein |

FOREIGN PATENT DOCUMENTS

| | | | |
|---|---|---|---|
| BR | 102017018379 | A2 | 5/2018 |
| CA | 2313376 | A1 | 7/2000 |
| DE | 1928065 | A1 | 5/1970 |
| DE | 102013110498 | A1 | 3/2015 |
| DE | 112014000906 | T5 | 11/2015 |
| EP | 2191439 | B1 | 2/2009 |
| EP | 2047738 | A2 | 4/2009 |
| EP | 3146831 | B1 | 3/2017 |
| EP | 2944179 | B1 | 11/2017 |
| EP | 3245859 | A1 | 11/2017 |
| EP | 3095313 | B1 | 5/2019 |
| EP | 3972381 | A1 | 3/2022 |
| EP | 4201189 | A1 | 6/2023 |
| JP | 6216795 | B2 | 10/2017 |
| WO | 2013078328 | A2 | 5/2013 |
| WO | 2023288249 | A1 | 1/2023 |

OTHER PUBLICATIONS

Birrell et al., "Corn Population Sensor for Precision Farming", "American Society of Agricultural Engineers. Annual Meeting", 1995, vol. 95, No. 1334, Publisher: ASAE.

D. Easton, "Corn Population and Plant Spacing Variability: The Next Mapping Layer", 1996, pp. 723-727, Publisher: ASA-CSSA-SSSA, Published in: Madison, WI.

(56) References Cited

OTHER PUBLICATIONS

Drago, Row by Row 2020 Special Report Harvest Study Reveals Most Corn Heads Leaving Yield in the Field.
Farm Show, "Easton Goers, Inc. Space Wheel Checks Seed Placement In Field—Space Cadet", 1996, Publisher: Farm Show.
Haizhou Li, "Design and Evaluation of a Non-Intrusive Corn Population Sensor", "Trace: Tennessee Research and Creative Exchange, Doctoral Dissertations, Graduate School", Aug. 2007, Publisher: University of Tennessee, Knoxville.
Headsight, Inc., "Row Guidance for Corn", Jan. 2021, https://headsight.com/row-guidance-corn.
Hummel et al., "Sensing Corn Population—Another Variable in the Yield Equation".
John Deere SSA, "AutoTrac RowSense | Precision AG | John Deere SSA", Jan. 2021, https://www.deere.com/sub-saharan/en/technology-products/precision-ag/autotrac-rowsense/.
Jonathan P. Kelly, "By-Plant Prediction of Corn (*Zea mays* L.) Grain Yield Using Height and Stalk Diameter", 2009, Publisher: Faculty of the Graduate College of the Oklahoma State University.
Luck et al., "Sensor Ranging Technique for Determining Corn Plant Population", "Faculty Papers and Publications in Animal Science—Animal Science Department", 2008, vol. 920, Publisher: University of Nebraska—Lincoln.
Plattner, C. E., J. W. Hummel 1996. Corn Plant Population Sensor for Precision Agriculture. In: P.C. Robert, R.H. Rust, W.E. Larson, editors, Precision Agriculture, ASA, CSSA, SSSA, Madison, WI. p. 785-794.
Reichhardt Electronic Innovations, "PSR Sensor Guidance", Jan. 2021, www.reichhardt.com/us_products_autosteer-system_autoguidance-tac.html.
Shrestha et al., "Automatic Corn Plant Population Measurement Using Machine Vision", "Transactions of the ASAE", 2003, pp. 559-565, vol. 46(2), Publisher: American Society of Agricultural Engineers.
Sudduth, K.A., Birrell, S.J., Krumpelman, M.J., Robert, P., Rust, R.H., & Larson, W.E. (2000). Field evaluation of a corn population sensor.
Yeyin Shi, "Corn Plant Location, Spacing and Stalk Diameter Measurements Using Optical Sensing Technologies", May 2014, Publisher: Faculty of the Graduate College of the Oklahoma State University.
Yu, H. Zheng, S. R. Kulkarni, H. V. Poor, "Outlier elimination for robust ellipse and ellipsoid fitting," in Proc. 3rd IEEE Int. Workshop Comput. Adv. Multi-Sensor Adapt. Process. (CAMSAP), Aruba, Dutch Antilles, Dec. 2009, pp. 33-36.
Contributions to Wikimedia projects (Feb. 20, 2020), Numerical integration. Wikipedia. Https://web.archive.org/web/20200325094046/https://en.wikipedia.org/wiki/numerical_integration (Year: 2020).
Area of a circle (Mar. 10, 2020). Wikipedia. Https://web.archive.org/web/20200325064526/https://en.wikipedia.org/wiki/Area_of_acircle (year 2020).
Miller et al (Nov. 16, 2016). The Plant Journal. https://onlinelibrary.wiley.com/doi/pdf/10.1111/tpj.13320 of GIS Ag Maps (here in as "GIS), Yield Monitor Data Post-Calibration (Linear and Non-Linear) Examples", Jan. 20, 2022, 8 pages + 1 SS page (9 pgs total).
Li, Dawei, et al. "An overlapping-free leaf segmentation method for plant point clouds." IEEE Access 7 (2019): 129054-129070 (Year: 2019).
Luck et al., "Precision Agriculture—Best Management Practices for Collecting Accurate Yield Data and Avoiding Errors during Harvest", 2014, 6 pages.
Sprague et al., "Corn Ear Detection and Orientation Estimation Using Deep Learning", 2024, https://arxiv.org/abs/2412.14954.
Lensing, Keith, "Algorithm Development of a Multi-Section Crop Detection System for a Corn Head", 2015, https://dr.lib.iastate.edu/entities/publication/8cb6f0d6-31e2-4ff9-8c1e-eb70dc210e5f.

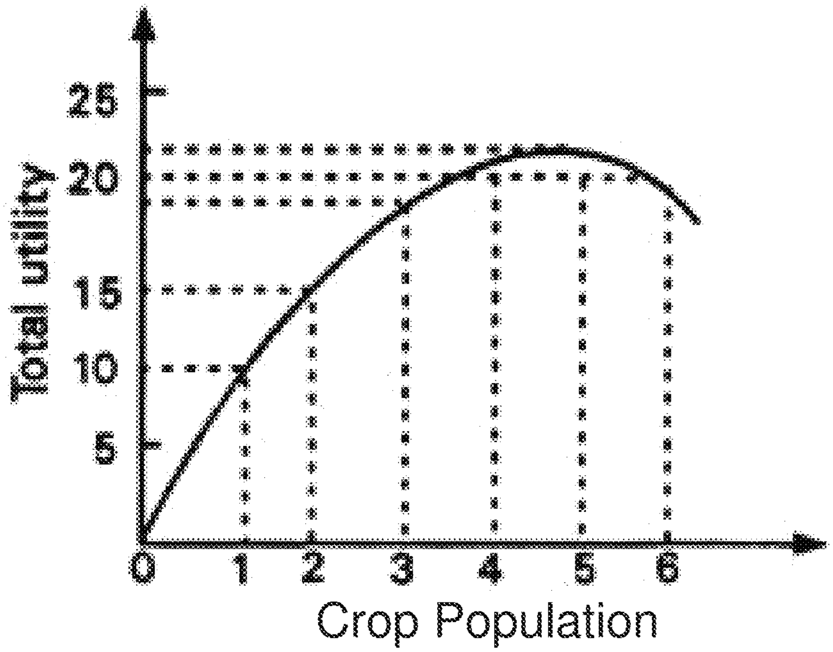
FIG. 1 – Total Utility
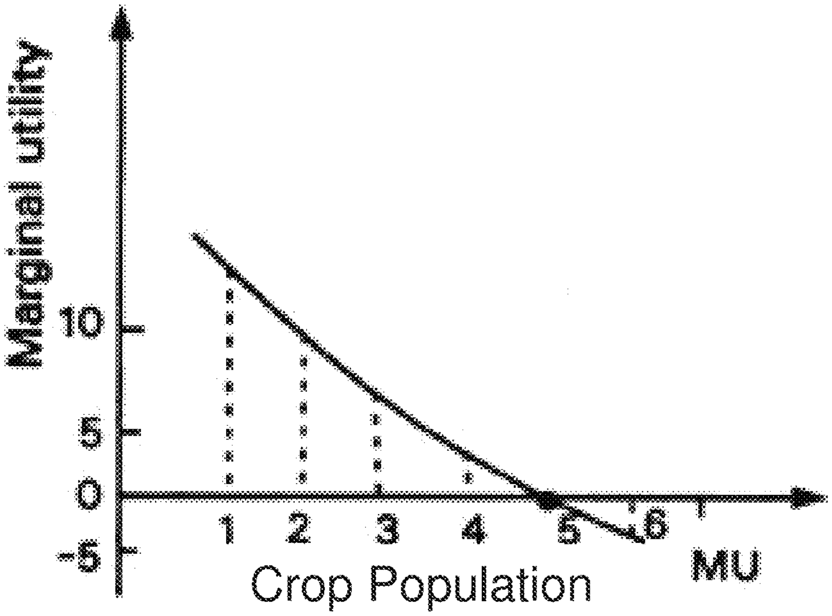
FIG. 2 – Marginal Utility

Table 1

| | | | | | | | | | | | | | | | |
|---|---|---|---|---|---|---|---|---|---|---|---|---|---|---|---|
| | | | | | | | | | | | | | | current Yield | |
| | | | | | | | | | | | | | | 246.44 | |
| | | Row 1 | Row 2 | Row 3 | Row 4 | Row 5 | Row 6 | Row 7 | Row 8 | Row 9 | Row 10 | Row 11 | Row 12 | 246.44 | YPK |
| | **Stand** | 33280 | 35650 | 30800 | 33230 | 29240 | 27320 | 33040 | 30930 | 34190 | 37620 | 28900 | 31520 | 32143.33 | 7.666909 |
| **Weighted average method** | | 255.15 | 273.33 | 236.14 | 254.77 | 224.18 | 209.46 | 253.31 | 237.14 | 262.13 | 288.43 | 221.57 | 241.66 | 246.44 | |
| Disclosed | **method YPK** | 7.44 | 7.01 | 7.94 | 7.45 | 8.28 | 8.72 | 7.49 | 7.92 | 7.27 | 6.68 | 8.36 | 7.79 | | |
| Disclosed | **Method Yielc** | 247.73 | 249.89 | 244.65 | 247.67 | 242.14 | 238.29 | 247.47 | 244.84 | 248.63 | 251.33 | 241.53 | 245.65 | 245.82 | |
| | | | | | | | | | | | | | | | |

FIG. 7

ROW-BY-ROW YIELD ESTIMATION SYSTEM AND RELATED DEVICES AND METHODS

CROSS-REFERENCE TO RELATED APPLICATION(S)

This application claims the benefit under 35 U.S.C. § 119(e) to U.S. Provisional Application 63/241,393, filed Sep. 7, 2021, and entitled Row-by-Row Estimation System and Related Devices and Methods, which is hereby incorporated herein by reference in its entirety for all purposes.

TECHNICAL FIELD

The disclosure relates to devices, systems, and methods for use during agricultural harvest.

BACKGROUND

Various systems are known for showing yields during harvest. For example, yield monitors that transmit yield data to a monitor for display to the operator are understood. However, this yield data is typically recorded at a very low resolution because a yield monitor by its nature shows only the aggregate yield across the entire swath of a header.

Certain prior known systems distribute yield across the swath of a corn header using a weighted average of the stand count, also referred to as stalk population. Yet, these prior known systems do not account for a plant's ability to flex—where nearby plants may make up yield for lost nearby plants. That is, plants adjacent to a missing plant may grow larger or extra ears, in the case of a corn plant, making up for some or all of the lost yield from the missing plant.

Further, the yield data from these prior known systems is typically delayed from the moment of harvest because it takes time for crop to enter the header, travel to and be sensed by the yield monitor, and for the information to be transmitted to a user.

There is a need in the art for systems and methods for improving the resolution of yield data.

BRIEF SUMMARY

Disclosed herein are various methods and related systems and devices for predicting and displaying yield values at a high resolution.

In Example 1 a yield estimation system comprising a harvester comprising a plurality of row units, one or more stalk sensors on each of the plurality of row units, and a yield monitor in communication with the plurality of row units. The system also comprising a processor configured to correlate data from the one or more stalk sensors to data from the yield monitor on a row-by-row basis and a display configured to display the correlated data to a user, wherein the processor is configured to estimate a row-by-row yield.

Examples 2 relates to the yield estimation system of Example 1, wherein the one or more stalk sensors are mechanical sensors configured to measure crop population.

Example 3 relates to the yield estimation system of Examples 1-2, wherein the correlated data comprises one or more of a row-by-row yield map, a row-by-row yield per thousand (YPK), and an amount of lost yield.

Example 4 relates to the yield estimation system of Examples 1-3, further comprising a database in communication with the processor, the database comprising historical field data.

Example 5 relates to the yield estimation system of Examples 1-4, further comprising a cloud storage configured to store data from the yield monitor and data from the one or more stalk sensors for further processing.

Example 6 relates to the yield estimation system of Examples 1-5, wherein the one or more stalk sensors are optical sensors configured to measure crop population.

Example 7 relates to the yield estimation system of Examples 1-6, wherein the processor is further configured to adjust a yield per thousand (YPK) curve in real-time or near real-time.

In Example 8 a method of predicting yield on a row-by-row basis, comprising retrieving one or more yield inputs, generating a yield per thousand (YPK) curve, and calculating a per row estimated yield.

Example 9 relates to the method of Example 8, further comprising inputting one or more of stalk sensor data and yield monitor data.

Example 10 relates to the method of Examples 8-9, further comprising displaying the per row estimate yield on a display.

Example 11 relates to the method of Examples 8-10, wherein the one or more yield inputs are derived from a stalk sensor and a yield monitor.

Example 12 relates to the method of Examples 8-11, wherein the stalk sensor is one or more of a mechanical sensor, an optical sensor, a stalk population sensor, an aerial imager, and a thermal camera.

Example 13 relates to the method of Examples 8-12, further comprising adjusting the YPK curve based on periodic feedback from a yield monitor or one or more stalk sensors.

Example 14 relates to the method of Examples 8-13, further comprising calculating a YPK for each row.

In Example 15 a yield estimation system, comprising an operations unit, comprising a processor, a memory in communication with the processor, and a communications unit in communication with the processor and the memory. The system also comprising a display in communication with the operations unit, at least one stalk sensor in communication with the operations unit and configured to detect one or more stalk attributes, and a yield monitor in communication with the operations unit and configured to measure crop yield, wherein the operation unit is configured to processor inputs from the at least one stalk sensor and the yield monitor to estimate a yield per row.

Example 16 relates to the yield estimation system of Example 15, wherein the at least one stalk sensor is one or more of mechanical sensors, optical sensors, aerial cameras, and thermal cameras.

Example 17 relates to the yield estimation system of Examples 15-16, wherein the one or more stalk attributes include stalk count, stalk size, and stalk circumference.

Example 18 relates to the yield estimation system of Examples 15-17, wherein memory stores one or more yield per thousand (YPK) curves.

Example 19 relates to the yield estimation system of Examples 15-18, wherein the processor is configured to adjust one or more of the YPK curves based on real-time or near real-time feedback from the at least one stalk sensor or the yield monitor.

Example 20 relates to the yield estimation system of Example 15-19, wherein the processor is configured to calculate a yield per thousand (YPK) for each row.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 1 is a chart showing total utility of crop populations, according to one implementation.

FIG. 2 is a chart showing marginal utility of crop populations, according to one implementation.

FIG. 7 is a table showing total yield calculating according to the described method, according to one implementation.

DETAILED DESCRIPTION

Figure 3:
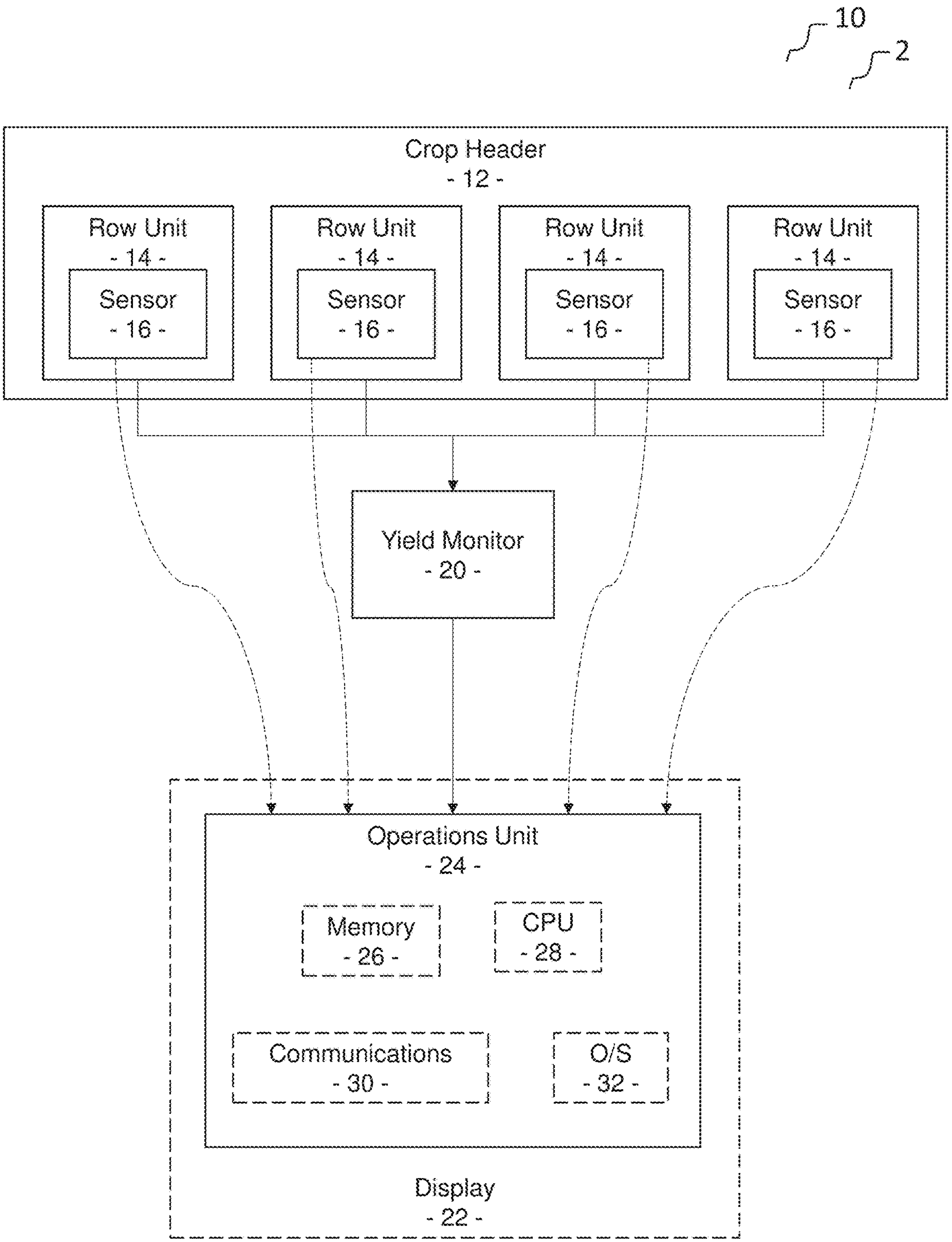
FIG. 3 is a schematic diagram of the yield estimation system according to one implementation.

Disclosed and contemplated herein are methods and associated systems and devices for estimating and/or predicting yield distributions, referred to generally as a yield estimation system 10. Certain implementations provide a high-resolution, row-by-row or per plant yield estimate for use by operators, stakeholders, and the like. Further implementations will be apparent to those of skill in the art.

Certain of the disclosed implementations can be used in conjunction with any of the devices, systems or methods taught or otherwise disclosed in U.S. Pat. No. 10,684,305 issued Jun. 16, 2020, entitled "Apparatus, Systems and Methods for Cross Track Error Calculation From Active Sensors," U.S. patent application Ser. No. 16/121,065, filed Sep. 4, 2018, entitled "Planter Down Pressure and Uplift Devices, Systems, and Associated Methods," U.S. Pat. No. 10,743,460, issued Aug. 18, 2020, entitled "Controlled Air Pulse Metering apparatus for an Agricultural Planter and Related Systems and Methods," U.S. Pat. No. 11,277,961, issued Mar. 22, 2022, entitled "Seed Spacing Device for an Agricultural Planter and Related Systems and Methods," U.S. patent application Ser. No. 16/142,522, filed Sep. 26, 2018, entitled "Planter Downforce and Uplift Monitoring and Control Feedback Devices, Systems and Associated Methods," U.S. Pat. No. 11,064,653, issued Jul. 20, 2021, entitled "Agricultural Systems Having Stalk Sensors and/or Data Visualization Systems and Related Devices and Methods," U.S. Pat. No. 11,297,768, issued Apr. 12, 2022, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 17/226,002 filed Apr. 8, 2021, and entitled "Apparatus, Systems and Methods for Stalk Sensing," U.S. Pat. No. 10,813,281, issued Oct. 27, 2020, entitled "Apparatus, Systems, and Methods for Applying Fluid," U.S. patent application Ser. No. 16/371,815, filed Apr. 1, 2019, entitled "Devices, Systems, and Methods for Seed Trench Protection," U.S. Pat. No. 16,523,343, filed Jul. 26, 2019, entitled "Closing Wheel Downforce Adjustment Devices, Systems, and Methods," U.S. patent application Ser. No. 16/670,692, filed Oct. 31, 2019, entitled "Soil Sensing Control Devices, Systems, and Associated Methods," U.S. patent application Ser. No. 16/684,877, filed Nov. 15, 2019, entitled "On-The-Go Organic Matter Sensor and Associated Systems and Methods," U.S. patent application Ser. No. 16/752,989, filed Jan. 27, 2020, entitled "Dual Seed Meter and Related Systems and Methods," U.S. patent application Ser. No. 16/891,812, filed Jun. 3, 2020, entitled "Apparatus, Systems and Methods for Row Cleaner Depth Adjustment On-The-Go," U.S. patent application Ser. No. 16/918,300, filed Jul. 1, 2020, entitled "Apparatus, Systems, and Methods for Eliminating Cross-Track Error," U.S. patent application Ser. No. 16/921,828, filed Jul. 6, 2020, entitled "Apparatus, Systems and Methods for Automatic Steering Guidance and Visualization of Guidance Paths," U.S. patent application Ser. No. 16/939,785, filed Jul. 27, 2020, entitled "Apparatus, Systems and Methods for Automated Navigation of Agricultural Equipment," U.S. patent application Ser. No. 16/997,361, filed Aug. 19, 2020, entitled "Apparatus, Systems and Methods for Steerable Toolbars," U.S. patent application Ser. No. 16/997,040, filed Aug. 19, 2020, entitled "Adjustable Seed Meter and Related Systems and Methods," U.S. patent application Ser. No. 17/011,737, filed Sep. 3, 2020, entitled "Planter Row Unit and Associated Systems and Methods," U.S. patent application Ser. No. 17/060,844, filed Oct. 1, 2020, entitled "Agricultural Vacuum and Electrical Generator Devices, Systems, and Methods," U.S. patent application Ser. No. 17/105,437, filed Nov. 25, 2020, entitled "Devices, Systems and Methods For Seed Trench Monitoring and Closing," U.S. patent application Ser. No. 17/127,812, filed Dec. 18, 2020, entitled "Seed Meter Controller and Associated Devices, Systems and Methods," U.S. patent application Ser. No. 17/132,152, filed Dec. 23, 2020, entitled "Use of Aerial Imagery For Vehicle Path Guidance and Associated Devices, Systems, and Methods," U.S. patent application Ser. No. 17/164,213, filed Feb. 1, 2021, entitled "Row Unit Arm Sensor and Associated Systems and Methods," U.S. patent application Ser. No. 17/170,752, filed Feb. 8, 2021, entitled "Planter Obstruction Monitoring and Associated Devices and Methods," U.S. patent application Ser. No. 17/225,586, filed Apr. 8, 2021, entitled "Devices, Systems, and Methods for Corn Headers," U.S. patent application Ser. No. 17/225,740, filed Apr. 8, 2021, entitled "Devices, Systems, and Methods for Sensing the Cross Sectional Area of Stalks," U.S. patent application Ser. No. 17/323,649, filed May 18, 2021, entitled "Assisted Steering Apparatus and Associated Systems and Methods," U.S. patent application Ser. No. 17/369,876, filed Jul. 7, 2021, entitled "Apparatus, Systems, and Methods for Grain Cart-Grain Truck Alignment and Control Using GNSS and/or Distance Sensors," U.S. patent application Ser. No. 17/381,900, filed Jul. 21, 2021, entitled "Visual Boundary Segmentations and Obstacle Mapping for Agricultural Vehicles," U.S. patent application Ser. No. 17/461,839, filed Aug. 30, 2021, entitled "Automated Agricultural Implement Orientation Adjustment System and Related Devices and Methods," U.S. patent application Ser. No. 17/468,535, filed Sep. 7, 2021, entitled "Apparatus, Systems, and Methods for Row-by-Row Control of a Harvester," U.S. patent application Ser. No. 17/526,947, filed Nov. 15, 2021, entitled "Agricultural High Speed Row Unit," U.S. patent application Ser. No. 17/566,678, filed Dec. 20, 2021, entitled "Devices, Systems, and Method For Seed Delivery Control," U.S. patent application Ser. No. 17/576,463, filed Jan. 14, 2022, entitled "Apparatus, Systems, and Methods for Row Crop Headers," U.S. patent application Ser. No. 17/724,120, filed Apr. 19, 2022, entitled "Automatic Steering Systems and Methods," U.S. patent application Ser. No.

17/742,373, filed May 11, 2022, entitled “Calibration Adjustment for Automatic Steering Systems,” U.S. Patent Application 63/240,129, filed Sep. 2, 2021, entitled “Tile Installation System with Force Sensor,” U.S. Patent Application 63/241,393, filed Sep. 7, 2021, entitled “Row-by-Row Estimation System and Related Devices and Methods,” U.S. Patent Application 63/289,445, filed Dec. 14, 2021, entitled “Seed Tube Guard,” U.S. Patent Application 63/292,796, filed Dec. 22, 2021, entitled “Data Visualization and Analysis for Harvest Stand Counter,” U.S. Patent Application 63/299,724, filed Jan. 14, 2022, entitled “Agricultural Mapping,” U.S. Patent Application 63/302,824, filed Jan. 25, 2022, entitled “Seed Meter with Integral Mounting Method for Row Crop Planter,” U.S. Patent Application 63/303,144, filed Jan. 26, 2022, entitled “Load Cell Backing Plate,” U.S. Patent Application 63/315,850, filed Mar. 2, 2022, entitled “Cross Track Error Stalk Sensor,” U.S. Patent Application 63/346,665, filed May 27, 2022, entitled “Seed Delivery Tube Camera for Furrow Monitoring,” U.S. Patent Application 63/351,602, filed Jun. 13, 2022, entitled “Apparatus, Systems and Methods for Image Plant Counting,” U.S. Patent Application 63/357,082, filed Jun. 30, 2022, entitled “Seed Tube Guard,” U.S. Patent Application 63/357,284, filed Jun. 30, 2022, entitled “Grain Cart Bin Level Sharing,” U.S. Patent Application 63/394,843, filed Aug. 3, 2022, entitled “Hydraulic Cylinder Position Control for Lifting and Lowering Towed Implements,” U.S. Patent Application 63/395,061, filed Aug. 4, 2022, entitled “Seed Placement in Furrow,” and U.S. Patent Application 63/400,943, filed Aug. 25, 2022, entitled “Combine Yield Monitor Automatic Calibration System Using Grain Cart with Weighing System,” each of which is incorporated herein by reference for all purposes.

In various implementations, the disclosed per row or per plant yield estimation system 10 estimates the distribution of yield on a row-by-row basis by using the measured yield from a combination of sources including, but not limited to, the full swath and row-by-row harvest stand population data from stalk counting and/or measuring sensors. Various further implementations may estimate yield on a plant-by-plant basis.

As would be recognized by those of skill in the art, local yields can change based on a number of factors, including for example soil quality, water flow, population, missing plants, late emergence, weather, and other factors, as would be appreciated. The various devices, systems, and methods disclosed and contemplated herein utilize this data to estimate precise row-by-row yield data and maps for display, use, and analysis.

In various implementations, the yield estimation system 10 disclosed and contemplated herein increases the data resolution of the yield layer of harvest maps and other data. For example, a typical combine harvester has a 12-row header. Each row is about 2.5 feet wide, so the total width of the header is about 30 feet. Yield is typically recorded in 1 second intervals, and typical harvest speed is about 5 mph, or approximately 7.5 ft/s. Accordingly, the effective resolution of the harvest data is a box 7.5 feet long by 30 feet wide. The disclosed row-by-row yield estimation system can increase the resolution to 7.5 feet long by 2.5 ft wide or better, as is explained herein. It is appreciated that this improved-resolution data can be used by operators, stakeholders, farmers, and others to make hybrid and population decisions, along with creating variable rate fertility and seeding prescriptions, and other operational decisions as would be understood.

Further, high resolution yield data can help farmers and other stakeholders understand the magnitude of the yield lost because of the missing or late emerged plants. For example, the yield estimation system 10 and the data generated therefrom may show a stakeholder the number of bushels of yield lost because areas of the field that had more missing plants than expected.

Still further, the high-resolution yield data from the system, can be valuable for people and companies doing agronomic research. For example, this data can be used to study what the harvested stand was and its yield as research is completed on hybrids or other agronomic practices.

Turning to the drawings in greater detail, it is understood that as the population of corn plants increases the total yield will also increase, but not at a directly proportional rate, following the general shape of the total utility curve of FIG. 1, due to diminishing returns owing to density and other factors well understood in the field. Instead, as the population of plants increases the total yield increases at a decreasing rate—the overall rate of increase in yield slows. In certain circumstances, and once the population of plants crosses a certain threshold, the total yield may decrease. Said another way, as the number of plants increases in a given area, the total yield can increase at a decreasing rate and eventually may decrease. Accordingly, operators, stakeholders and the like would greatly benefit from knowing the specific row-by-row-yield estimates provided by the disclosed system, devices, and methods.

It is further understood that as the population of corn plants increases per plant yield decreases, following the general shape of the marginal utility curve of FIG. 2. That is, as the population increases, the yield for each individual plant will decrease. Because the yield per plant is typically a very small number, this can be exemplified by looking at the yield per 1000 plants (YPK), as shown in Eq. 1:

$$YPK = \frac{\text{Yield for a given area (bushels}/ac)}{\text{Corn plants for a given area (plants}/ac)} * \frac{1(\text{plants}/ac)}{1000(K\ \text{plants}/ac)}$$

Alternative measurements for yield per multiple plants are possible and would be recognized by those of skill in the art. The various calculations and steps contemplated herein may be modified for theses various alternative measurements.

In one specific example, for a given area, the YPK of a population of 30,000 plants may be greater than the YPK at a population of 40,000 plants with all other variables being equal, even if the overall/total yield for the population of 40,000 plants is greater. Said another way, crops have a decreasing marginal utility as the number of plants increases in a given area, for reasons that would be readily appreciated.

Turning now to FIG. 3, in various implementations the yield estimation system 10 may be used in connection with any known harvester 2, such as a harvester 2 having a header 12 configured to harvest row crops. In various implementations, the harvester 2 is configured to harvest crops through the row units 14 disposed on the header 12, as would be readily appreciated. Once harvested by the row units 14, the crops flow towards the yield monitor 20, as would be recognized by those of skill in the art.

In certain implementations, the row units 14 may include one or more sensors 16. The sensors 16 may be stalk counting and/or measuring sensors 16, such as those disclosed in U.S. application Ser. No. 16/445,161, filed Jun. 18, 2019, and entitled “Agricultural Systems Having Stalk Sensors and/or Data Visualization Systems and Related Devices and Methods," U.S. application Ser. No. 16/800,469, filed Feb. 28, 2020, and entitled "Vision Based Stalk Sensors and Associated Systems and Methods," U.S. application Ser. No. 17/013,037, filed Sep. 4, 2020, and entitled "Apparatus, Systems, and Methods for Stalk Sensing," and U.S. application Ser. No. 17/226,002, filed Apr. 8, 2021, and entitled "Apparatus, Systems, and Methods for Stalk Sensing," each of which are incorporated herein by reference.

Continuing with the implementation of FIG. 3, the sensors 16 are in operational communication via a wired or wireless connection with an operations unit 24, which may be located in the cab of the vehicle or harvester 2. In various implementations, the operations unit 24 is housed within a display 22, such as the InCommand® display from Ag Leader® or other display device as would be recognized. In alternative implementations, the operations unit 24 is, in whole or in part, remote to the harvester 2. For example, one or more components of the operations unit 24 may be cloud based and in wireless electronic communication with a display 22 and the harvester 2 components. Various hardware, software, and firmware devices necessary to effectuate the devices, systems, and method disclosed herein would be appreciated by those of skill in the art.

In various implementations of the system 10, the operations unit 24 includes the various processing and computing components necessary for the operation of the system 10, including receiving, recording, and processing the various received signals, generating the requisite calculations, and commanding the various hardware, software, and firmware components necessary to effectuate the various processes described herein. That is, in certain implementations, the operations unit 24 comprises a processor 28 that is optionally in communication with a memory 26 and an operating system 32 or software and sufficient media to effectuate the described processes, and can be used with an operating system 32, a memory/data storage 26 and the like, as would be readily appreciated by those of skill in the art. It is appreciated that in certain implementations, the data storage 26 and other operations unit 24 components can be local, as shown in FIG. 3, or cloud-based, or some combination thereof.

In various implementations, the system 10 and operations unit 24 can comprise a circuit board, a microprocessor, a computer, or any other known type of processor or central processing unit (CPU) 28 that can be configured to assist with the operation of the system 10. In further embodiments, a plurality of CPUs 28 can be provided and operationally integrated with one another and the various components of other harvester 2 systems. Further, it is understood that one or more of the operations units 24 and/or its processors 28 can be configured via programming or software to control and coordinate the recordings from and/or operation of various sensor components, such as stalk sensors 16, as would be readily appreciated.

In various implementations, the system 10 is configured to estimate or predict yield on a row-by-row, or optionally plant-by-plant, basis by use of yield data from the yield monitor 20, a yield curve, a YPK curve or equation, and/or other similar curve or mathematical representation as would be understood in light of the present disclosure. That is, the system 10 is configured to attribute the actual yield measured by the yield monitor 20 to individual row units 14 across a header 12. Certain further implementations may attribute yield to individual plants or sections of plants.

Figure 4:
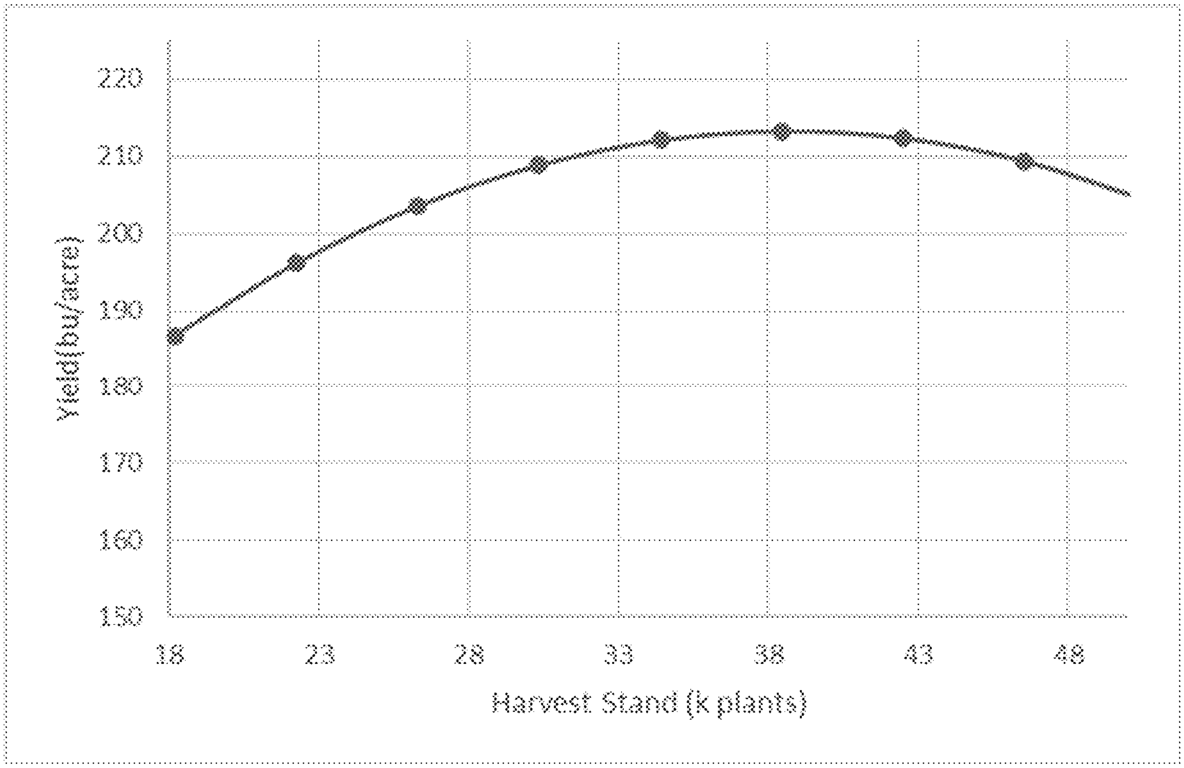
FIG. 4 is a flow diagram of the yield estimation system, according to one implementation.

In certain implementations, the system 10 is programmed with a yield curve, such as that of FIG. 4, or other inputted, historical, or real-time yield data correlating total measured yield to plant populations. The yield curve of FIG. 4 shows the yield (bu/acre) across varying crop populations (also referred to as harvest stands). In implementations utilizing historical field data, the historical data selected may be particular to a certain crop, hybrid, environmental condition, etc. as would be appreciated. It is understood that various factors including, but not limited to, weather, field treatments, machinery, and/or seed type are used to determine the yield curve.

Figure 5:
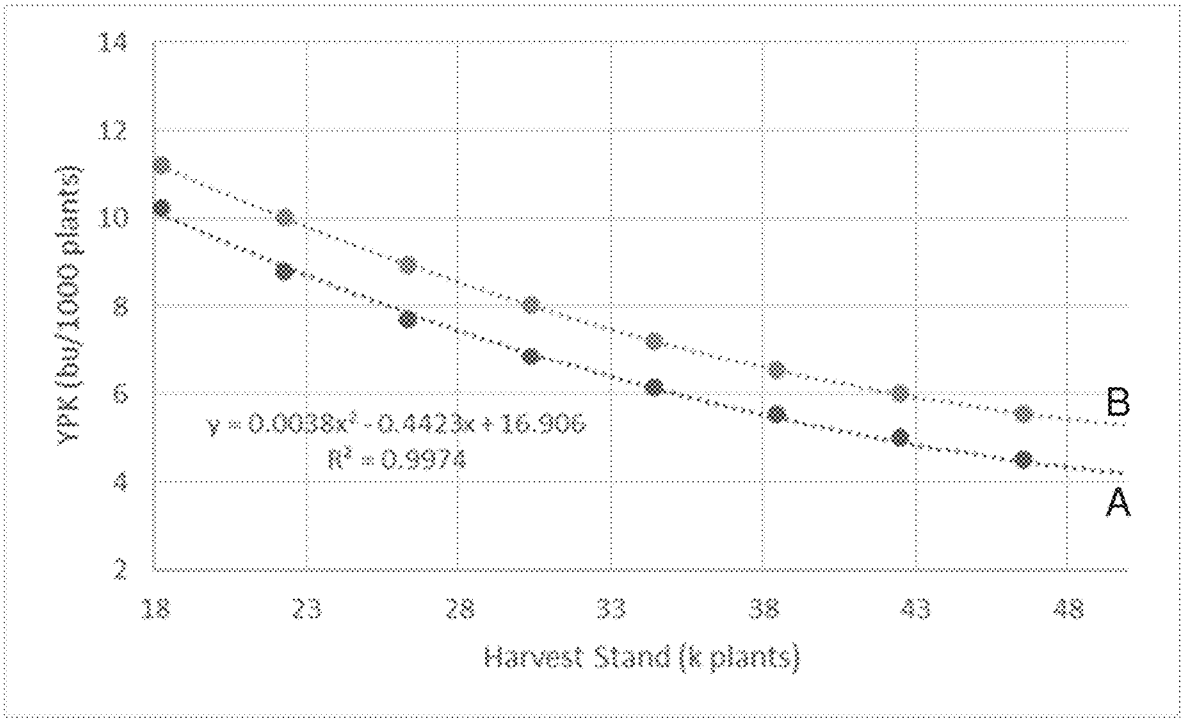
FIG. 5 is an exemplary yield curve, according to one exemplary implementation.

From the yield curve, or other yield data, a YPK, or other measurement of yield per plant or number of plants, can be determined for various populations. The YPK values can be plotted against the harvest stand/stalk count/crop population, as shown for example in FIG. 5 at line A. From this YPK curve, a regression line can be fitted to generate an equation, such as a quadratic equation, for calculating the YPK for discrete harvest stands/stalk counts/crop populations, the number of plants in a given area. The YPK equation in the specific example of FIG. 5 is:

$$y=0.0038x^2-0.4423x+16.906$$

As can be seen, as the population increases the marginal yield—yield per plant—decreases, as described above.

Figure 6:
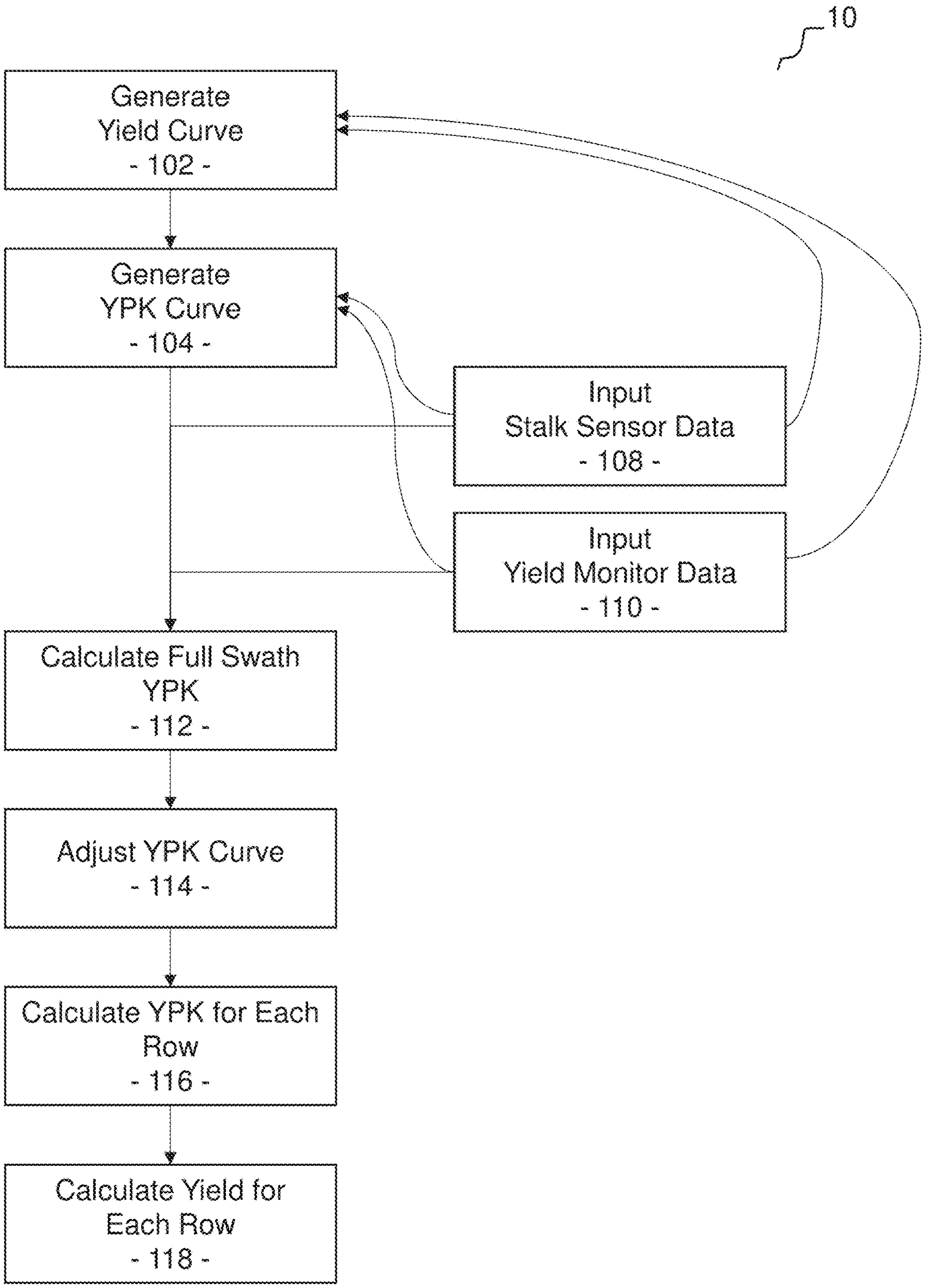
FIG. 6 is an exemplary YPK curve, according to one exemplary implementation.

Turning now to FIG. 6, the system 10 is configured to execute a series of one or more steps. Each of the steps is optional and may be performed in any order not at all. In some implementations, one or more of the steps are executed iteratively.

In a first optional step, the system 10 generates or retrieves a yield curve (box 102), such as that described above. The yield curve or other yield data provided to the system 10 correlates yield to population. For example, the yield curve may plot the harvest stand (in thousands of plants) against the yield (bu/acre), other similar curves/equations would be understood and appreciated by those of skill in the art.

In another optional step, the system 10 generates a YPK equation or curve (box 104), such as that described above. The YPK curve or the YPK data correlates YPK to various populations. Other similar measurements of yield per plant may be determined, as would be understood by those of skill in the art. In some implementations the YPK curve is generated (box 104) from the yield curve (box 102) or other yield data correlating yields to plant population.

In various implementations, in a further optional step, stalk sensor data is inputted (box 108) into the system 10, as is the yield monitor data (box 110). In some implementations, the stalk sensor data (box 108) includes data regarding the number of stalks that have passed through a row unit 14 and/or sensor 16 over a given period of time or over a particular area.

In various implementations, the stalk sensor data (box 108) can be derived from any of the known sources of stalk sensor data, such as those described in detail in the incorporated references. For example, stalk sensor data (box 108) drawn from mechanical or optical sensors, or other sensors placed on or near the harvester row units, or via other methods of determining stalk count and other characteristics, such as size, circumference, and the like.

In various implementations, the stalk sensor data (box 108) is drawn from motors, such as electric motors, in operational communication with the row units, such that changes in electrical current or other signals are processed, such as by filtering and other analysis, for use as stalk sensor data (box 108).

In various implementation, stalk sensor data (box 108) may be derived from aerial imagery, such as images from drones, manned aerial vehicles, vehicle and/or implement mounted cameras, and the like, as would be appreciated by those of skill in the art. In certain implementations, thermal imagery may be used to obtain stalk data, as stalk sensor data (box 108).

In some implementations, the stalk sensor data (box 108) is derived from one or more stalk population sensors and includes population data, such as the population of a given area or areas. In various implementations, the yield monitor data (box 110) from the yield monitor 20 includes data regarding the actual yield measured across the swath at discrete points in time.

In certain implementations, the system 10 divides the stalk sensor data (box 108) and the yield monitor data (box 110) into multiple intervals, such as in a time series. Intervals may be about one second, about a half second, or any other interval as would be appreciated.

In some implementations, stalk sensor data (box 108) may be derived across different time periods, such as different growth stages. For example, data may be captured at an early stage of growth, late stage of growth, and at harvest.

In various implementations of the system 10, the yield data and stalk counter data of any specific interval are mismatched due to the delay from the point stalks encounter the sensors 16 and when the yield from those stalks is measured by the yield monitor 20. This delay is a known factor and can be factored into the data processing by the system 10 such that the yield monitor data (box 110) can be matched to the appropriate stalk sensor data (box 108).

In another optional step, using the full swath harvest stand data or other similar data as discussed above (stalk sensor data (box 108)) and full swath yield (yield monitor data (box 110)), a full swath YPK can be calculated (box 112). See Eq. 1 above.

In a still further optional step, the YPK or similar curve, discussed above, can be adjusted (box 114), for example based on actual field conditions during harvest. In certain implementations, the Y-intercept of the YPK curve can be adjusted (box 114) so that the full swath YPK (box 112) and the full swath harvest stand fit on the YPK curve. Various alternative adjustments may be executed, as would be understood, to align actual measured yields and populations to yield per plant curves.

Shown in one example depicted in FIG. 5 at line B, the Y intercept was adjusted from 16.906 to 18.001 to match the known YPK and population at a certain location or point in time. In this example, the adjustment was made using the data of Table 1 where the population was 32,143.33 and the YPK was 7.666909.

In the example of FIG. 5 and Table 1, the quadratic YPK curve/equation is used to solve for the expected YPK at the measured full swath harvest stand:

$$YPK=0.0038(32.143^2)-0.4423(32.143)+16.906=6.572$$

Next, the expected YPK is compared to the actual YPK (box 112 of FIG. 6), here 7.667 to determine the adjustment factor:

$$\text{Factor}=\text{Actual}\,YPK-\text{Expected}\,YPK=7.667-6.572=1.095$$

Then, the adjustment factor is used to adjust the Y intercept of the YPK quadratic equation/curve:

$$\text{New } Y \text{ intercept}=\text{Old } Y \text{ intercept}+\text{Factor}=16.906+1.095=18.001$$

Therefore, the adjusted YPK quadratic equation/curve is:

$$YPK=0.0038x^2-0.4423x+18.001$$

In a further optional step, the adjusted YPK quadratic equation/curve can be used to calculate an estimated YPK for each row based on each row's population/stand and the adjusted YPK equation/curve, as previously discussed.

It is appreciated that the system 10, according to certain implementations, utilizes the adjustment factor and subsequent row-by-row YPK calculations at each interval or at multiple intervals in the time series. In this further optional step, the yield per plant curve may be iteratively adjusted based on one or more actual field conditions. In further steps, yield per plant calculations are updated iteratively.

Continuing with FIG. 6, in various implementations, the system 10, in another optional step, may use the quadratic YPK equation/curve and the second curve, line B, to calculate a YPK for each row (box 116) based on the per row harvest stand/crop population/stalk count.

In a further step, the YPK can be multiplied by the harvest stand for each row to calculate an estimated yield for each row (box 118). See Table 1 for example.

At each interval, continuously, or periodically, the system 10 can adjust the YPK curve to account for the potential difference in yield at a specific location, such as by changing the y-intercept of the YPK curve, or other similar curve or equation as discussed above. In these implementations, row-by-row yield data can be generated because the full swath YPK and the full swath harvest stand/crop population/stalk count are known data points, such that the YPK curve must pass through that specific point and the curve can follow a known trajectory or trajectory derived from historical data.

In various implementations, further methods to dynamically adjust this curve are implemented. In certain implementations, fertility adjusts the Y-intercept and hybrid genetics adjust the coefficients. That is, various hybrid genetics may have the most effect of the slope of the YPK curve.

In certain implementations, the system 10 utilizes a Kalman filter to dynamically adjust parameters that predict yield from sensor data, such as stand count derived from one or more sensors as described above. These mathematical attributes define the curves shape and are adjustable, as would be appreciated.

In certain implementations, the stalk sensor data includes stalk size/circumference information, as noted above. This stalk size information may be processed to further improve row by row yield prediction. As would be understood, undersized or smaller stalks often will have a reduced yield when compared to larger or full-sized stalks. As such, a row of plants with reduced sized stalks will have a lower yield than a row of plants with full size stalks despite the rows having the same number of plants. For example, certain rows may experience compacted soil, such as from a vehicle or implement being driven next to the row, and the compacted soil may cause stalks to have a reduced size and therefore a reduced yield when compared to rows and plants that are not near compacted soil. In various implementations, the system processes the stalk size data to adjust estimated yields for rows based on the size of the stalks.

As can be seen in Table 1, the total yield calculated according to the method described herein, closely follows use of a full swath average. Further, yield deviations row-by-row according to the presently described method are more precise than those in which is a simple weighted average is used.

In certain implementations, the system 10 uses stalk sensor data, such as the stand count or stalk population, from the full header swath and corresponding yield measurements to generate and/or update a YPK curve as the field is harvested. In various implementations, the system 20 generates a new YPK curve for every field, hybrid, soil type, and/or any other sub-region of a field or parameter. Further, in some implementations, the system 10 could also maintain a current YPK curve, continually build a new YPK curve, and/or toggle between YPK curves at various intervals. For example, in some implementations, the system 10 may detect when significant changes are made between a current YPK curve and a new YPK curve and dynamically adjust to use of the new, or most current, YPK curve.

In some implementations, the system 10 does not utilize a YPK curve but rather calculates the row-by-row yield from the yield curve alone, as would be understood in light of this disclosure.

In various implementations, the data can be displayed to a user on a display 22, such as SMS, or AgFiniti® from Ag Leader®.

Although the disclosure has been described with references to various embodiments, persons skilled in the art will recognized that changes may be made in form and detail without departing from the spirit and scope of this disclosure.

What is claimed is:

1. A yield estimation system comprising:

(a) a harvester comprising:

(i) a plurality of row units;

(ii) one or more stalk sensors on each of the plurality of row units; and (iii) a yield monitor in communication with the plurality of row units;

(b) a processor configured to correlate data from the one or more stalk sensors to data from the yield monitor on a row-by-row basis; and (c) a display configured to display the correlated data to a user, wherein the processor is configured to estimate a row-by-row yield and adjust a yield per thousand (YPK) curve in real-time.

2. The yield estimation system of claim 1, wherein the one or more stalk sensors are mechanical sensors configured to measure crop population.

3. The yield estimation system of claim 1, wherein the correlated data comprises one or more of a row-by-row yield map, a row-by-row yield per thousand (YPK), and an amount of lost yield.

4. The yield estimation system of claim 1, further comprising a database in communication with the processor, the database comprising historical field data.

5. The yield estimation system of claim 1, further comprising a cloud storage configured to store data from the yield monitor and data from the one or more stalk sensors for further processing.

6. The yield estimation system of claim 1, wherein the one or more stalk sensors are optical sensors configured to measure crop population.

7. A method of predicting yield on a row-by-row basis, comprising:

retrieving one or more yield inputs;

generating a yield per thousand (YPK) curve;

calculating a per row estimated yield to estimate a row-by-row yield, and adjusting a yield per thousand (YPK) curve in real-time.

8. The method of claim 7, further comprising inputting one or more of stalk sensor data and yield monitor data.

9. The method of claim 7, further comprising displaying the per row estimate yield on a display.

10. The method of claim 7, wherein the one or more yield inputs are derived from a stalk sensor and a yield monitor.

11. The method of claim 10, wherein the stalk sensor is one or more of a mechanical sensor, a stalk population sensor, an optical sensor, an aerial imager, and a thermal camera.

12. The method of claim 7, further comprising adjusting the YPK curve based on periodic feedback from a yield monitor or one or more stalk sensors.

13. The method of claim 7, further comprising calculating a YPK for each row.

14. A yield estimation system, comprising:

(a) an operations unit, comprising:

(i) a processor;

(ii) a memory in communication with the processor; and (iii) a communications unit in communication with the processor and the memory;

(b) a display in communication with the operations unit;

(c) at least one stalk sensor in communication with the operations unit and configured to detect one or more stalk attributes; and (d) a yield monitor in communication with the operations unit and configured to measure crop yield, wherein the operation unit is configured to process inputs from the at least one stalk sensor and the yield monitor to estimate a yield per row and wherein memory stores one or more yield per thousand (YPK) curves and the processor is configured to adjust one or more of the YPK curves based on real-time feedback from the at least one stalk sensor or the yield monitor.

15. The yield estimation system of claim 14, wherein the at least one stalk sensor is one or more of mechanical sensors, optical sensors, aerial cameras, and thermal cameras.

16. The yield estimation system of claim 14, wherein the one or more stalk attributes include stalk count, stalk size, and stalk circumference.

17. The yield estimation system of claim 14, wherein the processor is configured to calculate a yield per thousand (YPK) for each row.

* * * * *